United States Patent [19]
Fouché et al.

[11] 3,882,235
[45] May 6, 1975

[54] FUNGICIDAL COMPOSITIONS COMPRISING A 10, 11 DIHYDRODIBENZO [B,F] AZEPINE DERIVATIVE

[75] Inventors: Jean Fouché, Bourg-la-Reine; André Léger, Massy, both of France

[73] Assignee: Rhone-Poulenc, S.A., Paris, France

[22] Filed: Aug. 1, 1973

[21] Appl. No.: 384,419

Related U.S. Application Data

[62] Division of Ser. No. 48,450, June 22, 1970, Pat. No. 3,792,042.

[30] Foreign Application Priority Data

June 24, 1969  France ............................. 69.21176
Apr. 9, 1970   France ............................. 70.12838

[52] U.S. Cl. ............................................... 424/244
[51] Int. Cl. ............................................... A01n 9/22
[58] Field of Search ................................... 424/244

[56] References Cited
UNITED STATES PATENTS
3,622,565  11/1971  Fouché .............................. 424/244

OTHER PUBLICATIONS
Chemical Abstracts, Vol. 68 (1968), p. 59421v.

*Primary Examiner*—Vincent D. Turner
*Attorney, Agent, or Firm*—Stevens, Davis, Miller & Mosher

[57] ABSTRACT

New 10,11-dihydrodibenzo[b,f]azepines of the formula:

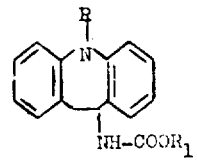

wherein R represents hydrogen or alkyl of 1 through 5 carbon atoms, and $R_1$ represents alkyl of 1 through 7 carbon atoms, are useful as fungicides.

8 Claims, No Drawings

FUNGICIDAL COMPOSITIONS COMPRISING A10, 11 DIHYDRODIBENZO [B,F] AZEPINE DERIVATIVE

This is a division of application Ser. No. 48,450, filed June 22, 1970 now U.S. Pat. No. 3,792,042.

This invention relates to new 10,11-dihydrodibenzoazepine derivatives, to a process for their preparation, and compositions containing them.

The 10,11-dihydrodibenzo[b,f]azepine derivatives of the present invention are those of the general formula:

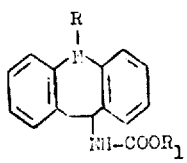

I wherein R represents a hydrogen atom or a straight- or branched-chain alkyl radical containing 1 to 5 carbon atoms and $R_1$ represents a straight- or branched-chain alkyl radical containing 1 to 7 carbon atoms.

According to a feature of the invention, the compounds of general formula I are prepared by the process which comprises reacting a chloroformate of the general formula:

$$Cl - CO - O - R_1$$

II (wherein $R_1$ is as hereinbefore defined) with a 10-amino-10,11-dihydrodibenzo[b,f]azepine of the general formula:

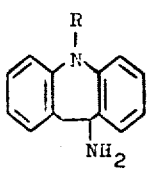

III wherein R is as hereinbefore defined.

The reaction is generally carried out in an anhydrous medium, at a temperature between −25° and +25°C., either in an inert organic solvent such as an aromatic hydrocarbon (e.g. benzene or toluene), a chlorinated hydrocarbon (e.g. chloroform or dichloroethane), an ether (e.g. diethyl ether, diisopropyl ether, tetrahydrofuran or dioxan). or an amide (e.g. dimethylformamide), and in the presence of an inorganic base, preferably an alkali metal carbonate or bicarbonate, or an organic base such as triethylamine, or in a basic solvent such as pyridine. The process is advantageously carried out either in anhydrous benzene in the presence of triethylamine or simply in anhydrous pyridine.

In the case where the symbol R in formula III represents a hydrogen atom, only the —NH₂ grouping reacts under the reaction conditions and it is not necessary to protect the —NH— grouping of the ring.

The starting materials of general formula III can be prepared by reduction of an oxime of the general formula:

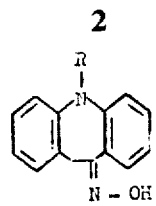

IV (wherein R is as hereinbefore defined) by the action of sodium in a saturated primary aliphatic alcohol containing 2 to 6 carbon atoms, for example butanol, or by the action of sodium amalgam.

The compounds of general formula IV can be prepared from the corresponding ketones of the general formula:

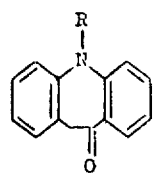

V wherein R is as hereinbefore defined, by application of any known method for the preparation of oximes from ketones.

The ketones of general formula V wherein R represents an alkyl radical can be prepared in accordance with the method described in the specification of British Pat. No. 961,444, entitled "Dibenz[b,f]azepine derivatives and processes for the preparation thereof" granted to J. R. Geigy A.G. on an application filed Nov. 16, 1960 by alkylation of 10-methoxydibenzo[b,f]azepine of the formula:

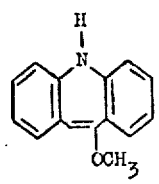

VI by reaction with a compound of the general formula:

$$R - X$$

wherein R represents a straight- or branched-chain alkyl radical containing 1 to 5 carbon atoms, and X represents the acid residue of a reactive ester (e.g. a halogen atom), followed by hydrolysis of the resulting intermediate product of the formula:

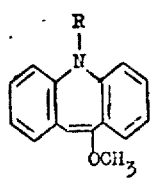

VII wherein R is as hereinbefore defined.

The 10,11-dihydrodibenzoazepine derivatives obtained by the aforesaid process may optionally be purified by physical methods such as crystallisation or chromatography.

The dihydrodibenzoazepine derivatives of general formula I possess valuable fungicidal properties; they are particularly active against cucumber mildew (*Erysiphe polyphaga*), against flax mildew (*Erysiphe lini*), against apple mildew (*Podosphaera leucotricha*), against rosebush mildew (*Sphaerothica pannosa*) and against mahonia mildew (*Microsphaera berberidis*). Preferred compounds are those in which R represents a hydrogen atom or a methyl, ethyl or propyl radical, and $R_1$ represents a straight-chain alkyl radical containing 3 to 6 carbon atoms and in particular 5-methyl-10-propoxy-carbonylamino-10,11-dihydrodibenzo[b,f]azepine, 5-methyl-10-butoxycarbonylamino-10,11-dihydrodibenzo[1,f]azepine, 10-hexyloxycarbonylamino-10,11-dihydrobenzo[b,f]azepine, 10-propoxycarbonylamino-10,11-dihydrodibenzo[b,f]azepine, 10-butoxycarbonylamino-10,11-dihydrodibenzo[b,f]azepine and 10-pentyloxycarbonylamino-10,11-dihydrodibenzo[b,f]azepine.

The present invention also includes within its scope fungicidal compositions which contain, as the active ingredient, at least one 10,11-dihydrodibenzoazepine derivative of general formula I in association with one or more diluents or adjuvants compatible with the compound(s) and suitable for use in agriculture. Preferably the compositions contain between 80 and 0.005% by weight of active compound.

The compositions may be solid if there is employed a powdered solid compatible diluent such as talc, calcined magnesia, kieselguhr, tricalcium phosphate, powdered cork, absorbent charcoal, or a clay such as kaolin or bentonite. These solid compositions are preferably prepared by grinding the active compound with the solid diluent, or by impregnating the solid diluent with a solution of the compound in a volatile solvent, evaporating the solvent, and if necessary grinding the product so as to obtain a powder.

Instead of a solid diluent, there may also be used a liquid in which the active compound is dissolved or dispersed. The compositions may thus take the form of suspensions, emulsions or solutions in organic or aqueous-organic media, for example acetophenone, aromatic hydrocarbons such as toluene or xylene, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonia derivatives of products based on ethylene oxide condensates, such as condensates of ethylene oxide with octylphenol, or fatty acid esters of anhydrosorbitols which have been rendered soluble by etherification of the free hydroxyl radicals by condensation with ethylene oxide. It is preferable to use agents of the non-ionic type because they are not sensitive to electrolytes. When emulsions are required, the compound may be used in the form of self-emulsifying concentrates containing the active substance dissolved in the emulsifying agent or in a solvent containing an emulsifying agent compatible with the compound and solvent, a simple addition of water to such concentrates producing compositions ready for use.

These compositions, which can be solid or liquid, optionally contain one or more other pesticides, such as insecticides or fungicides, compatible with the compounds of general formula I and with the diluent or adjuvant.

The new dihydrodibenzoazepine derivatives of general formula I are preferably employed as fungicides in a quantity of 25 to 75 g. of active compound per hectolitre of water. In the field the compounds can be applied at the rate of 25 to 75 g. per hectare.

The following Examples illustrate the invention.

EXAMPLE 1

Ethyl chloroformate (5.7 g.) is added to a solution of 5-methyl-10-amino-10,11-dihydrodibenzo[b,f]azepine (11.2 g.) in anhydrous pyridine (100 cc.), the temperature being maintained at −20°C. The reaction mixture is kept at −20°C. for 1 hour and then at 2°C. for 1 hour. The mixture is then taken up in distilled water (700 cc.) and twice extracted with diethyl ether (total 200 cc.). The ethereal solution is successively washed with distilled water (100 cc.), twice with 5N hydrochloric acid (total 100 cc.) and three times with distilled water (total 300 cc.). The ethereal solution is dried over anhydrous sodium sulphate and evaporated. The residue (13.1 g.) is dissolved in boiling diisopropyl ether (25 cc.). After cooling at 2°C. for 3 hours, the crystals which have formed are filtered off, twice washed with ice-cold diisopropyl ether (20 cc.) and dried under reduced pressure (20 mm.Hg). 5-Methyl-10-ethoxycarbonylamino-10,11-dihydrodibenzo[b,f]azepine (11.6 g.), melting at 95°C., is obtained.

5-Methyl-10-amino-10,11-dihydrodibenzo[b,f]azepine employed as starting material can be obtained as follows:

5-Methyl-10-oxo-10,11-dihydrodibenzo[b,f]azepine, melting at 104°C. is prepared in accordance with British Pat. No. 961,444;

5-Methyl-10-hydroxyimino-10,11-dihydrodibenzo[b,f]azepine (53.3 g.), melting at 196°C., is prepared by reaction of an excess of hydroxylamine with 5-methyl-10-oxo-10,11-dihydrodibenzo[b,f]azepine (60 g.) in an aqueous methanol medium under reflux;

5-Methyl-10-amino-10,11-dihydrodibenzo[b,f]azepine (11.5 g.) melting at 96°C., is prepared by reduction of 5-methyl-10-hydroxyimino-10,11-dihydrodibenzo[b,f]azepine (19 g.) by means of sodium (13 g.) in butanol at 100°C.

EXAMPLE 2

A solution of methyl chloroformate (2.95 g.) in anhydrous benzene (20 cc.) is added at about 20°C. to a solution of 5-methyl-10-amino-10,11-dihydrodibenzo[b,f]azepine (7.0 g.) and triethylamine (3.16 g.) in anhydrous benzene (70 cc.). The reaction mixture is left at 20°C. for about 20 hours and is then taken up in distilled water (100 cc.) and diethyl ether (100 cc.). Insoluble matter (0.3 g.), melting at 260°C., is filtered off. The organic solution is washed with distilled water (100 cc.), twice with 2N methanesulphonic acid (total 50 cc.), and three times with distilled water (total 150 cc.), dried over anhydrous magnesium sulphate and then evaporated. The residue (7.8 g.) is taken up in diethyl ether (100 cc.) and a further amount of insoluble matter (0.5 g.), melting at 260°C., is filtered off. After evaporation of the filtrate the residue (7.1 g.) is dissolved in boiling diisopropyl ether (50 cc.). After cooling at 2°C. for 17 hours, the crystals which have formed are filtered off, washed three times with diisopropyl ether (total 15 cc.) and dried under reduced pressure (20 mm.Hg). The resulting product (6.5 g.), melting at 108°–110°C. is recrystallised from methanol (25 cc.) to yield 5-methyl-10-methoxycarbonylamino-10,11-dihydrodibenzo[b,f]azepine (4.5 g.) melting at 118°–120°C.

EXAMPLE 3

A solution of ethyl chloroformate (5.4 g.) in anhydrous benzene (30 cc.) is added at 3°C., over a period of 30 minutes, to a solution of 10-amino-10,11-dihydrodibenzo[b,f]azepine (10.5 g.) and triethylamine (5.0 g.) in anhydrous benzene (150 cc.). The reaction mixture is left for about 4 hours at 20°C. and is then treated with distilled water (150 cc.), 2N sodium hydroxide solution (25 cc.) methylene chloride (100 cc.) and diethyl ether (100 cc.). Insoluble matter (2.5 g.), melting at 200°C., is filtered off. The organic solution is washed three times with distilled water (total 150 cc.), twice with 2N methanesulphonic acid (total 150 cc.), twice with a 5% (w/v) sodium bicarbonate solution (total 50 cc.), and then five times with distilled water (total 125 cc.). The organic solution is dried over anhydrous sodium sulphate and then evaporated. The residue (10.5 g.) is taken up in diethyl ether (150 cc.); an insoluble material (1.1 g.), melting at 195°C., is filtered off. The filtrate is evaporated. The residue (8.6 g.) is dissolved in a 15 : 85 (parts) by volume mixture of ethyl acetate and cyclohexane (280 cc.), and the resulting solution is chromatographed through a 0.2 – 0.5 mm. silica gel column (silica: 50 g.; column diameter: 18 mm.). Elution with the same solvent yields a first fraction of 300 cc. which is discarded, and then a second fraction of 300 cc.; concentration of this second fraction yields 10-ethoxycarbonylamino-10,11-dihydrodibenzo[b,f]azepine (6.4 g.) in the form of an oil.

Analysis: Calculated %: N 9.92
Found: 9.6 – 9.7

10-Amino-10,11-dihydrodibenzo[b,f]azepine employed as starting material can be obtained as follows:

10-Methoxy-dibenzo[b,f]azepine (melting at 125°C.) is prepared in accordance with the method described in the specification of British Pat. No. 943,277 entitled "Dibenz[b,f]azepines and process for their preparation" granted to J. R. Geigy A.G. on an application filed Nov. 16, 1960.

10-Oxo-10,11-dihydrodibenzo[b,f]azepine (8.1 g.), melting at 141°C., is prepared by the action of dilute hydrochloric acid on 10-methoxy-dibenzo[b,f]azepine (14.0 g.).

10-Hydroxyimino-10,11-dihydrodibenzo[b,f]azepine (6.1 g.), melting at 168°C., is prepared by reaction of an excess of hydroxylamine with 10-oxo-10,11-dihydrodibenzo[b,f]azepine (8 g.) in aqueous ethanol under reflux;

10-Amino-10,11-dihydrodibenzo[b,f]azepine (2.4 g.), melting at 123°C. is prepared by reaction of sodium amalgam (205 g.), containing 2.5% by weight of sodium, with 10-hydroxyimino-10,11-dihydrodibenzo[b,f]azepine (6.1 g.) in ethanol.

EXAMPLE 4

Propyl chloroformate (4.5 g.) is added to a solution of 5-methyl-10-amino-10,11-dihydrodibenzo[b,f]azepine (7.8 g.) in anhydrous pyridine (70 cc.) the temperature being maintained at −20°C. The reaction mixture is kept at −20°C. for 1 hour and then at 2°C. for 1 hour, and is then taken up in distilled water (500 cc.) and twice extracted with diethyl ether (total 300 cc.). The ethereal solution is successively washed three times with 2N hydrochloric acid (total 300 cc.) and then twice with distilled water (total 200 cc.). The ethereal solution is treated with vegetable charcoal (0.4 g.), dried over anhydrous sodium sulphate and evaporated. The residue (9.8 g.) is dissolved in ethanol (40 cc.) at about 40°C., and distilled water (40 cc.) is then gradually added to the solution obtained. After standing for 4 hours at 25°C. followed by 16 hours at 2° C., the crystals which have formed are filtered off, washed with a mixture of ethanol and water (1 : 1 by volume; 15 cc.), and and dried under reduced pressure (20 mm.Hg) to yield 5-methyl-10-propoxycarbonylamino-10,11-dihydrodibenzo[b,f]azepine (8.0 g.) melting at 70°–72°C. (instantaneous melting).

EXAMPLE 5

Isopropyl chloroformate (3.3 g.) is added to a solution of 5-methyl-10-amino-10,11-dihydrodibenzo[b,f]azepine (5.6 g.) in anhydrous pyridine (50 cc.), the temperature being kept at −20°C. The reaction mixture is kept at −20°C. for 1 hour, and then taken up in distilled water (400 cc.) and extracted three times with diethyl ether (total 150 cc.). The ethereal solution is successively washed three times with distilled water (total 150 cc.), three times with N hydrochloric acid (total 150 cc.), and five times with distilled water (total 150 cc.), and is then dried over anhydrous sodium sulphate and evaporated. The residue (6.1 g.) is dissolved in boiling diisopropyl ether (20 cc.). After standing for 16 hours at 2°C., the crystals which have formed are filtered off, washed with ice-cold diisopropyl ether (8 cc.) and then twice with petroleum ether (boiling point 40°–65°C.; total 20 cc.), and dried under reduced pressure (20 mm.Hg). 5-Methyl-10-isopropoxycarbonylamino-10,11-dihydrodibenzo[b,f]azepine (5.1 g.), melting at 91°C., is thus obtained.

EXAMPLE 6

Butyl chloroformate (5.0 g.) is added to a solution of 5-methyl-10-amino-10,11-dihydrodibenzo[b,f]azepine (7.8 g.) in anhydrous pyridine (70 cc.), the temperature being kept at −20°C. The reaction mixture is kept at −20°C. for 1 hour and then at 2°C. for 1 hour. The reaction mixture is then taken up in distilled water (500 cc.) and extracted three times with diethyl ether (total 210 cc.). The ethereal solution is successively washed three times with distilled water (total 150 cc.), twice with 2N hydrochloric acid (total 100 cc.), and four times with distilled water (total 200 cc.). The ethereal solution is treated with vegetable charcoal (0.1 g.), dried over anhydrous sodium sulphate and evaporated. The residue (10.6 g.) is dissolved in boiling petroleum ether (boiling point 40°–65°C.; 30 cc.). After standing for 3 hours at 2°C., the crystals which have formed are filtered off, washed twice with ice-cold petroleum ether (boiling point 40°–65°C.; total 20 cc.), and dried under reduced pressure (20 mm.Hg) to yield 5-methyl-10-butoxycarbonylamino-10,11-dihydrodibenzo[b,f]azepine (10.1 g.) melting at 77°C.

EXAMPLE 7

Isobutyl chloroformate (5.0 g.) is added to a solution of 5-methyl-10-amino-10,11-dihydrodibenzo[b,f]azepine (7.8 g.) in anhydrous pyridine (70 cc.), the temperature being kept at −20°C. The reaction mixture is kept at −20°C. for 1 hour and then at 2°C. for 1 hour. The reaction mixture is then taken up in distilled water (500 cc.) and extracted three times with diethyl ether (total 150 cc.). The ethereal solution is successively washed three times with distilled water (total 150 cc.), twice with 2N hydrochloric acid (total 100 cc.) and three times with distilled water (total 300 cc.). The ethereal solution is dried over sodium sulphate and evaporated. The residue (10.5 g.) is dissolved in boiling ethanol (30 cc.), and distilled water (25 cc.) is then gradually added to the resulting solution. After standing for 2 hours at 2°C., the crystals which have formed are filtered off, washed with a mixture of ethanol and water (1 : 1 by volume; 20 cc.) and dried under reduced pressure (20 mm.Hg) to yield 5-methyl-10-isobutoxycarbonylamino-10,11-dihydrodibenzo[b,-f]azepine (9.9 g.) melting at 86°C.

EXAMPLE 8

Ethyl chloroformate (2.9 cc.) is added at −20°C. to a solution of 5-ethyl-10-amino-10,11-dihydrodibenzo[b,f]azepine (6.5 g.) in anhydrous pyridine (60 cc.) over the course of 10 minutes. The resulting suspension is stirred at −20°C. for 1 hour and then at 2°C. for 1 hour 30 minutes. The reaction mixture is poured into ice-water (600 cc.). The oil which separates is twice extracted with diethyl ether (total 300 cc.). The combined ethereal solutions are twice washed with distilled water (total 300 cc.), then twice with N hydrochloric acid (total 300 cc.) and finally with a 2% (w/v) solution of sodium bicarbonate (150 cc.). The ethereal solution is dried over anhydrous magnesium sulphate and concentrated. The residue (7.4 g.) is distilled under reduced pressure to yield 5-ethyl-10-ethoxycarbonylamino-10,11-dihydrodibenzo[b,f]azepine (5.7 g.), b.p. 192°–194°C./0.9 mm.Hg.

5-Ethyl-10,11-dihydrodibenzo[b,f]azepine employed as starting material can be obtained as follows:

10-Methoxy-dibenzo[b,f]azepine is prepared as indicated in Example 3.

5-Ethyl-10-methoxy-dibenzo[b,f]azepine (15.4 g.), melting at 180°C., is prepared by the action of sodium amide followed by ethyl iodide, in hexamethylphosphotriamide, on 10-methoxy-dibenzo[b,f]azepine (20 g.).

5-Ethyl-10-oxo-10,11-dihydrodibenzo[b,f]azepine (10.7 g.), melting at 120°C., is prepared by the action of dilute hydrochloric acid on 5-ethyl-10-methoxydibenzo[b,f]azepine (12.7 g.).

5-Ethyl-10-hydroxyimino-10,11-dihydrodibenzo[b,-f]azepine (10.8 g.), melting at 207°C., is prepared by reaction of an excess of hydroxylamine with 5-ethyl-10-oxo-10,11-dihydrodibenzo[b,f]azepine (10.5 g.).

5-Ethyl-10-amino-10,11-dihydrodibenzo[b,f]azepine (6.7 g.), melting at 89°C., is prepared by reaction of sodium amalgam (335 g.), containing 2.5% by weight of sodium, with 5-ethyl-10-hydroxyimino-10,11-dihydrodibenzo[b,f]azepine (10 g.) in ethanol.

EXAMPLE 9

Following the procedure described in Example 8 but reacting 5-methyl-10-amino-10,11-dihydrodibenzo[b,-f]azepine (6.7 g.) and heptyl chloroformate (5.7 g.) in anhydrous pyridine (60 cc.), 5-methyl-10-heptyloxycarbonylamino-10,11-dihydrodibenzo[b,-f]azepine (8.6 g.), melting at 78°C., is obtained.

5-Methyl-10-amino-10,11-dihydrodibenzo[b,f]azepine employed as starting material can be obtained as indicated in Example 1.

EXAMPLE 10

Following the procedure described in Example 8 but reacting 5-propyl-10-amino-10,11-dihydrodibenzo[b,-f]azepine (5.9 g.) and ethyl chloroformate (2.7 g.) in anhydrous pyridine (65 cc.), 5-propyl-10-ethoxycarbonylamino-10,11-dihydrodibenzo[b,f]azepine (5.1 g.) is obtained.

Analysis: Calculated %: N 8.63
Found: 8.4

5-Propyl-10-amino-10,11-dihydrodibenzo[b,f]azepine employed as starting material can be obtained as follows:

10-Methoxy-dibenzo[b,f]azepine is prepared as indicated in Example 3.

5-Propyl-10-methoxy-dibenzo[b,f]azepine (18 g.), melting at 100°C., is prepared by the action of sodium amide followed by propyl bromide on 10-methoxy-dibenzo[b,f]azepine (20 g.) in a mixture of toluene and hexamethylphosphotriamide (10 : 1 by volume) at 90°–100°C.

5-Propyl-10-oxo-10,11-dihydrodibenzo[b,f]azepine (16.7 g.), melting at 60°–62°C. is prepared by the action of 2N hydrochloric acid on 5-propyl-10-methoxydibenzo[b,f]azepine (18 g.) under reflux for 1½ hours.

5-Propyl-10-hydroxyimino-10,11-dihydrodibenzo[b,f]azepine (17.2 g.), melting at 100°C., is prepared by the action of hydroxylamine hydrochloride (9.25 g.) and sodium acetate trihydrate (18.1 g.) on 5-propyl-10-oxo-10,11-dihydrodibenzo[b,f]azepine (16.7 g.) in a mixture of ethanol and water (3 : 1 by volume) under reflux for 5 hours.

5-Propyl-10-amino-10,11-dihydrodibenzo[b,f]azepine, the fumarate of which melts at 212°–215°C., is prepared by reduction of 5-propyl-10-hydroxyimino-10,11-dihydrodibenzo[b,f]azepine by means of sodium in butanol at 100°C.

EXAMPLE 11

Hexyl chloroformate (5.25 g.) is added over the course of 5 minutes, at −20°C., to a solution of 10-amino-10,11dihydrodibenzo[b,f]azepine (6.3 g.) in anhydrous pyridine (60 cc.). The resulting suspension is stirred for 2 hours at −20°C. and then for 2 hours at +2°C. The reaction mixture is poured into distilled water (500 cc.). The oil which separates is extracted three times with diethyl ether (total 450 cc.). The combined ethereal solutions are twice washed with N hydrochloric acid (total 300 cc.) and then twice with distilled water (total 200 cc.). The ethereal solution is dried over anhydrous magnesium sulphate and concentrated. The residue (8.3 g.) is dissolved in cyclohexane (800 cc.) and the resulting solution is chromatographed on silica (85 g.; column diameter 2.3 cm). Elution is carried out with a mixture of cyclohexane and ethyl acetate (9 : 1 by volume). After concentrating the eluates under reduced pressure, 10 -hexyloxycarbonylamino-10,11-dihydrodibenzo[b,f]azepine (7.7 g.) is obtained.

| Analysis: Calculated %: | C 74.53 | H 7.74 | N 8.28 |
|---|---|---|---|
| Found: | 73.2 | 7.8 | 7.7. |

5-Amino-10,11-dihydrodibenzo[b,f]azepine employed as starting material can be obtained as indicated in Example 3.

EXAMPLE 12

Following the procedure described in Example 11 but reacting 10-amino-10,11-dihydrodibenzo[b,f]azepine (6.3 g.) and methyl chloroformate (3.0 g.) in anhydrous pyridine (60 cc.), 10-methoxycarbonylamino-10,11-dihydrodibenzo[b,f]azepine (4.0 g.) is obtained.

| Analysis: Calculated %: | C 71.62 | H 6.01 | N 10.44 |
|---|---|---|---|
| Found: | 70.6 | 6.1 | 9.7. |

EXAMPLE 13

Following the procedure described in Example 11 but reacting 10-amino-10,11-dihydrodibenzo[b,f]azepine (6.3 g.) and propyl chloroformate (3.7 g.) in anhydrous pyridine (60 cc.), 10-propoxycarbonylamino-10,11-dihydrodibenzo[b,f]azepine (6.8 g.) is obtained.

| Analysis: Calculated %: | C 72.96 | H 6.80 | N 9.44 |
|---|---|---|---|
| Found: | 72.8 | 6.7 | 9.0. |

EXAMPLE 14

Following the procedure described in Example 11 but reacting 10-amino-10,11-dihydrodibenzo[b,f]azepine (6.3 g.) and butyl chloroformate (4.4 g.) in anhydrous pyridine (60 cc.), 10-butoxycarbonylamino-10,11-dihydrodibenzo[b,f]azepine (8.0 g.) is obtained.

| Analysis: Calculated %: | C 73.52 | H 7.14 | N 9.02 |
|---|---|---|---|
| Found: | 73.2 | 7.1 | 8.6 |

EXAMPLE 15

Following the procedure described in Example 11 but reacting 10-amino-10,11-dihydrodibenzo[b,f]azepine (6.3 g.) and pentyl chloroformate (4.8 g.) in anhydrous pyridine (60 cc.), 10-pentyloxycarbonylamino-10,11-dihydrodibenzo[b,f]azepine (7.5 g.) is obtained.

| Analysis: Calculated %: | C 74.05 | H 7.46 | N 8.63 |
|---|---|---|---|
| Found: | 73.8 | 7.7 | 8.2. |

EXAMPLE 16

Following the procedure described in Example 11 but reacting 10-amino-10,11-dihydrodibenzo[b,f]azepine (6.3 g.) and isopropyl chloroformate (4.1 g.) in anhydrous pyridine (60 cc.), 10-isopropoxycarbonylamino-10,11-dihydrodibenzo[b,f]azepine (5.5 g.), melting at 106°C., is obtained.

EXAMPLE 17

Following the procedure described in Example 11 but reacting 10-amino-10,11-dihydrodibenzo[b,f]azepine (6.7 g.) and isobutyl chloroformate (4.5 g.) in anhydrous pyridine (60 cc.), 10-isobutoxycarbonylamino-10,11-dihydrodibenzo[b,f]azepine (9.1 g.) is obtained.

| Analysis: Calculated %: | C 73.52 | H 7.14 | N 9.03 |
|---|---|---|---|
| Found: | 73.8 | 7.4 | 8.9 |

EXAMPLE 18

Sodium lignosulphite (25 g.), kaolin (470 g.) and "Tween 80" (5 g.) ["Tween" is a registered Trade Mark] are added to 5-methyl-10-ethoxycarbonylamino-10,11-dihydrodibenzo[b,f]azepine (500 g.). After grinding and sieving, the resulting powder is used, after dilution with water in the ratio of 100 g. of powder per 100 litres of water, to protect plants against attacks by mildew.

We claim:

1. A fungicidal composition comprising, as active ingredient, a fungicidally effective amount of a 10,11-dihydrodibenzo [b,f] azepine derivative of the formula

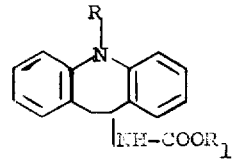

wherein R represents hydrogen or alkyl of 1 through 5 carbon atoms and $R_1$ represents alkyl of 1 through 7 carbon atoms in association with a diluent or adjuvant compatible with the dihydrodibenzoazepine derivative and suitable for use in agricultural fungicidal compositions, the quantity of dihydrodibenzoazepine derivative in the composition being between 80 and 0.0005% by weight of the composition.

2. The fungicidal composition of claim 1 wherein R represents hydrogen, methyl, ethyl or propyl, and $R_1$ represents straight chain alkyl of 3 through 6 carbon atoms.

3. The fungicidal composition of claim 1 wherein said derivative is 5-methyl-10-propoxycarbonylamino-10,11-dihydrodibenzo[b,f]azepine.

4. The fungicidal composition of claim 1 wherein said derivative is 5-methyl -10-butoxycarbonylamino-10,11-dihydrodibenzo[b,f]azepine.

5. The fungicidal composition of claim 1 wherein said derivative is 10-hexyloxycarbonylamino-10,11-dihydrodibenzo[b,f]azepine.

6. The fungicidal composition of claim 1 wherein said derivative is 10-propoxycarbonylamino-10,11-dihydrodibenzo[b,f]azepine.

7. The fungicidal composition of claim 1 wherein said derivative is 10-butoxycarbonylamino-10,11-dihydrodibenzo[b,f]azepine.

8. The fungicidal composition of claim 1 wherein said derivative is 10-pentyloxycarbonylamino-10,11-dihydrodibenzo[b,f]azepine.

* * * * *